US00RE40396E

(19) United States
(12) Reissued Patent
Lee

(10) Patent Number: US RE40,396 E
(45) Date of Reissued Patent: Jun. 24, 2008

(54) METHOD FOR DETECTING AND SEPARATING VERTICAL AND HORIZONAL SYNCHRONOUS SIGNALS FROM COMPUTER SYSTEM

(75) Inventor: Ji-Young Lee, Suwon (KR)

(73) Assignee: Samsung Electronics Co., Ltd., Suwon-si, Gyeonggi-do (KR)

(21) Appl. No.: 10/131,049

(22) Filed: Apr. 25, 2002

Related U.S. Patent Documents

Reissue of:
(64) Patent No.: 6,064,443
Issued: May 16, 2000
Appl. No.: 08/880,675
Filed: Jun. 23, 1997

(30) Foreign Application Priority Data

Jun. 21, 1996 (KR) ..... P-9622949

(51) Int. Cl.
*H04N 5/04* (2006.01)
*H04N 5/08* (2006.01)
*H04N 5/10* (2006.01)

(52) U.S. Cl. ..... 348/530; 348/500; 348/E5.018; 345/213

(58) Field of Classification Search ..... 348/500, 348/525, 529, 530, 531, 532, 533, 540, 546; 358/153, 154, 155; 345/213; *H04N 5/08, H04N 5/04, 5/10, 3/27, 5/46, 3/22*
See application file for complete search history.

(56) References Cited

U.S. PATENT DOCUMENTS 4,583,119 A * 4/1986 Roscoe ..... 348/500
4,709,267 A * 11/1987 Sendelweck ..... 348/525
4,800,429 A * 1/1989 Perkins ..... 348/500
4,894,719 A * 1/1990 Moon ..... 348/530
5,021,719 A * 6/1991 Arai et al.
5,502,498 A * 3/1996 Park et al. ..... 348/500

FOREIGN PATENT DOCUMENTS

JP 55-45151 * 3/1980 ..... 358/158
JP 62-262582 11/1987
JP 63-164676 * 7/1988
JP 20-1989-0146675 10/1989
JP 3-219285 * 9/1991
JP 4-70692 * 3/1992
JP 04-189087 7/1992
JP 05-075891 3/1993
JP 05-244450 9/1993
JP 5-244450 * 9/1993

OTHER PUBLICATIONS

English translation of Japanese document 63–164676 to Canon, Inc.; Jul. 8, 1988.*

* cited by examiner

*Primary Examiner*—Brian P. Yenke
(74) *Attorney, Agent, or Firm*—Robert E. Bushnell, Esq.

(57) ABSTRACT

A method for detecting and separating vertical and horizontal synchronous signals from a computer system. The input forms of the vertical and horizontal synchronous signals from the computer system are detected by scanning a vertical synchronous signal terminal, a horizontal/composite synchronous signal terminal and a synchronous-on-green terminal of the computer system. In accordance with the detected input forms, the vertical and horizontal synchronous signals are separated from each other and then adjusted in polarity. Therefore, the present invention requires no separate hardware for the separation and polarity adjustment of the vertical and horizontal synchronous signals, resulting in simplification in circuit construction and reductions in number of used components and size of a printed circuit board.

52 Claims, 8 Drawing Sheets

(Amended)

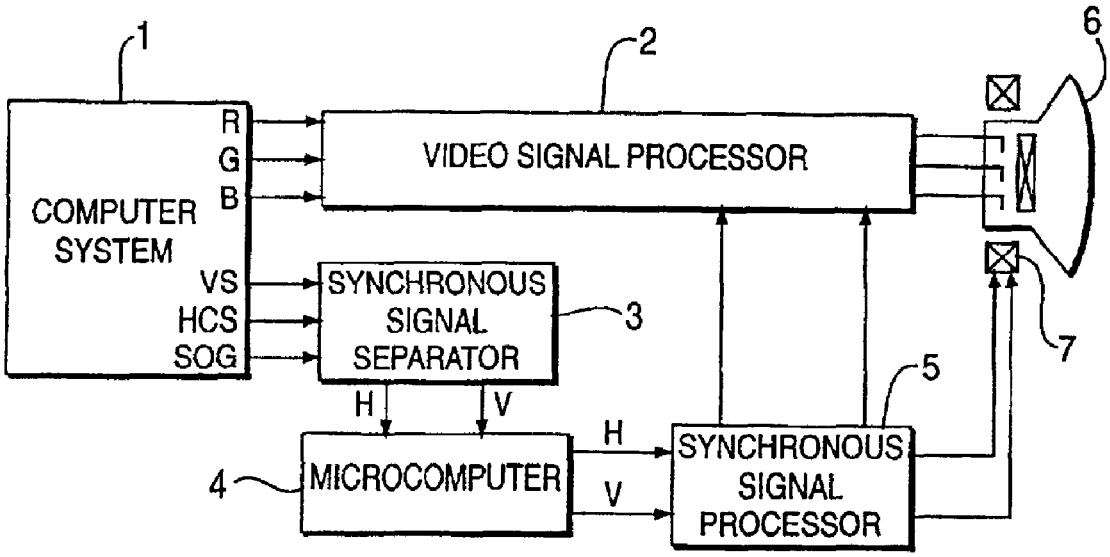
*FIG. 1* (Background Art)
(Amended)

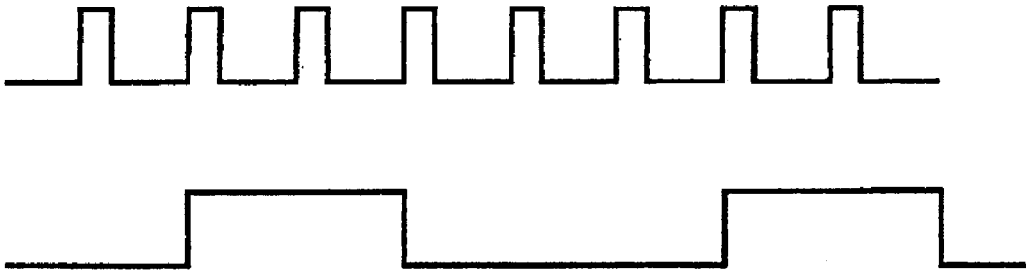
FIG. 2A (Background Art)
(Amended)
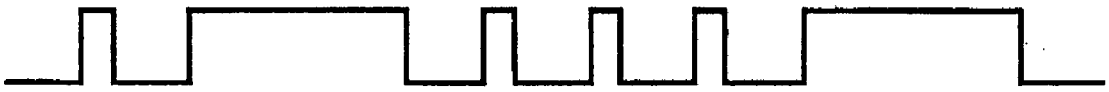
FIG. 2B (Background Art)
(Amended)
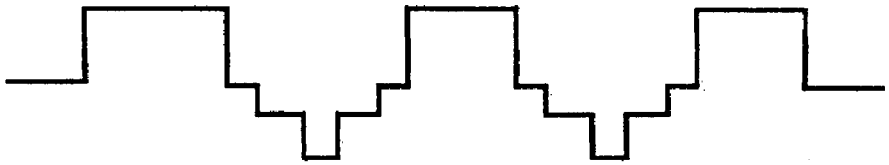
FIG. 2C (Background Art)
(Amended)

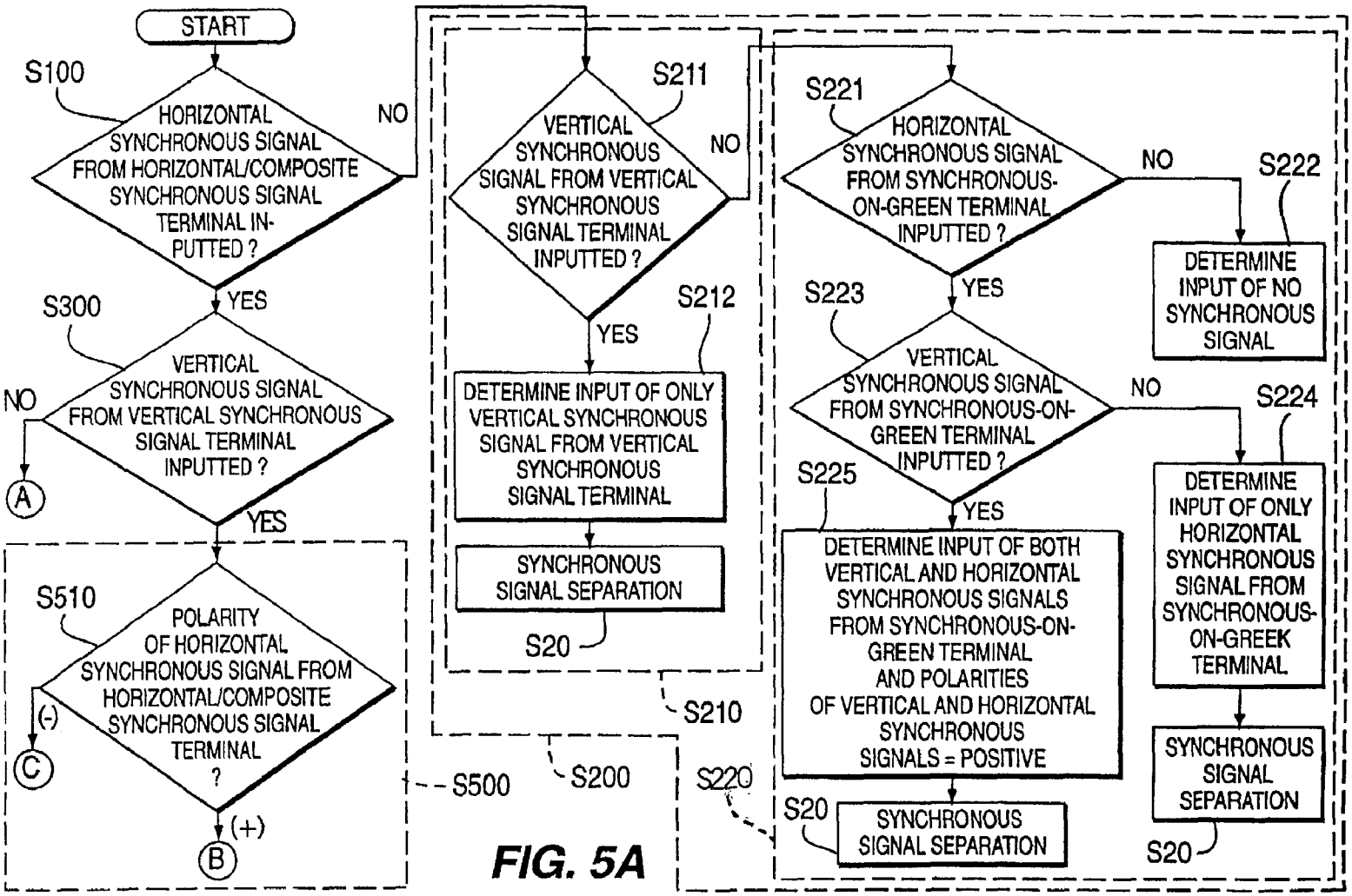
FIG. 5A
(Amended)

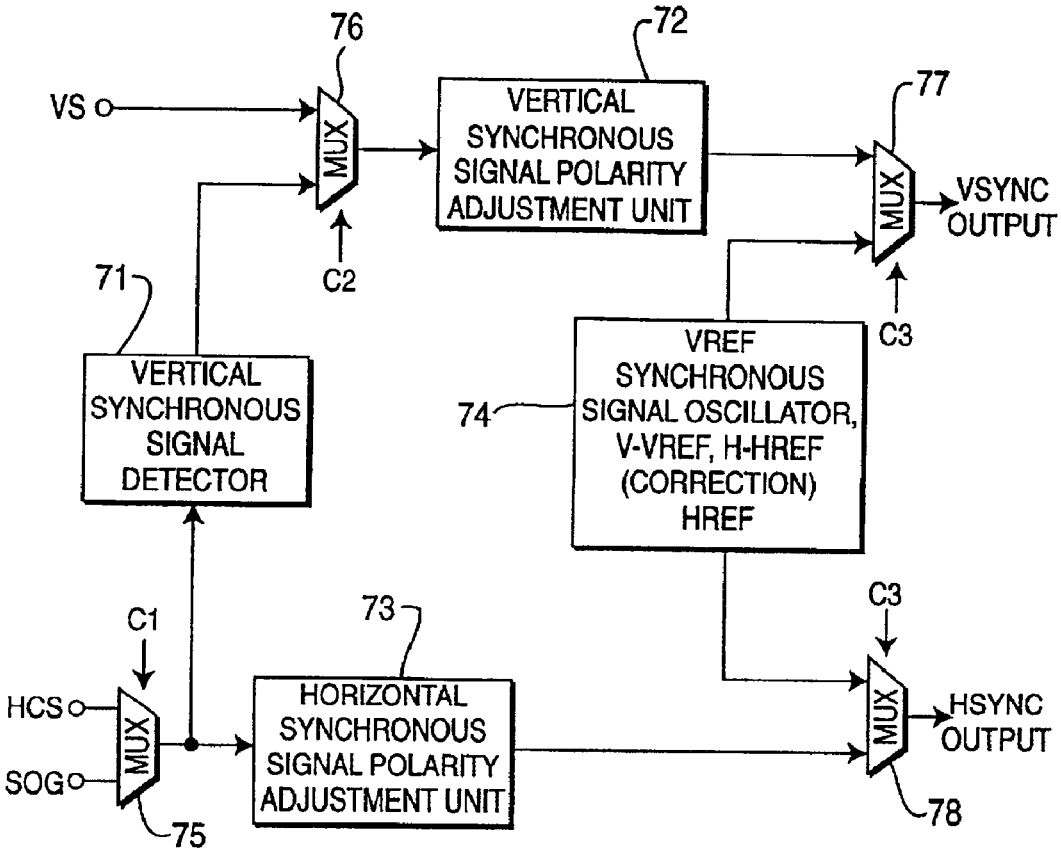
FIG. 6
FIG. 7A
FIG. 7B
FIG. 7C
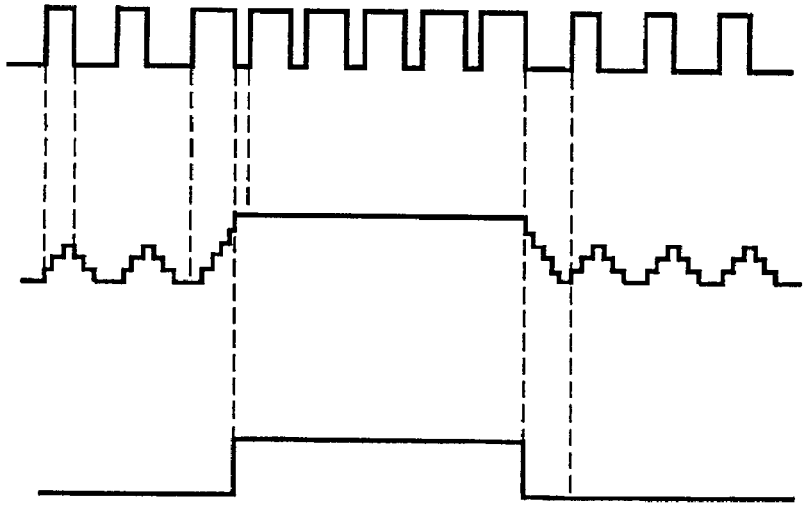

METHOD FOR DETECTING AND SEPARATING VERTICAL AND HORIZONAL SYNCHRONOUS SIGNALS FROM COMPUTER SYSTEM

Matter enclosed in heavy brackets [ ] appears in the original patent but forms no part of this reissue specification; matter printed in italics indicates the additions made by reissue.

CLAIM OF PRIORITY

This application makes reference to, incorporates the same herein, and claims all benefits accruing under 35 U.S.C. §119 from an application entitled Method For Detecting And Separating Vertical And Horizontal Synchronous Signals From Computer System earlier filed in the Korean Industrial Property Office on Jun. 21, 1996, and there duly assigned Serial No. 06-22949 by that Office.

BACKGROUND OF THE INVENTION

1. Field of the Invention

The present invention relates in general to a monitor which is used as a video display unit of a computer system, and more particularly to a method for detecting and separating vertical and horizontal synchronous signals from the computer system.

2. Description of the Prior Art

Generally, the user monitors and checks the operation status of a computer system by means of a monitor. The computer system outputs a signal based on the current operation and the monitor displays the output signal from the computer system on its screen. The monitor utilizes vertical and horizontal synchronous signals to display the output signal from the computer system on the screen. For this reason, the computer system outputs the vertical and horizontal synchronous signals to the monitor together with data to be displayed on the screen of the monitor. The computer system outputs the vertical and horizontal synchronous signals in various manners.

For examples, the computer system may output the vertical and horizontal synchronous signals separately or as one composite synchronous signal wherein the vertical and horizontal synchronous signals are combined. Alternatively, the computer system may combine the vertical and horizontal synchronous signals on a green color signal and output the resultant one synchronous-on-green (SOG) signal.

The monitor must separate the vertical and horizontal synchronous signals from the computer system from each other to use them individually.

For this reason, the monitor has to check input forms of the vertical and horizontal synchronous signals from the computer system and separate the vertical and horizontal synchronous signals from each other in accordance with the checked result.

The vertical and horizontal synchronous signals from the computer system may be different in polarity.

For example, the polarities of the separated vertical and horizontal synchronous signals may be both positive or negative. Alternatively, one of the polarities of the separated vertical and horizontal synchronous signals may be positive and the other may be negative.

In the composite synchronous signal, the vertical and horizontal synchronous signals are the same in polarity. Namely, the polarities of the vertical and horizontal synchronous signals are both positive or negative. In the synchronous-on-green signal, the polarities of the vertical and horizontal synchronous signals are both positive.

In this connection, the monitor must use hardware to separate and change the polarities of the separated vertical and horizontal synchronous signals suitably for the use therein.

As a result, the exemplary monitor requires additional hardware design work for the synchronous signal separator, resulting in increases in manufacturing cost and size of a printed circuit board. For this reason, the manufactured goods are degraded in competitiveness.

SUMMARY OF THE INVENTION

Therefore, the present invention has been made in view of the above problems, and it is an object of the present invention to provide a method for detecting and separating vertical and horizontal synchronous signals from a computer system using a microcomputer.

In accordance with the present invention, the above and other objects can be accomplished by a provision of a method for detecting and separating vertical and horizontal synchronous signals from a computer system, comprising the first step of scanning a vertical synchronous signal terminal, a horizontal/composite synchronous signal terminal and a synchronous-on-green terminal of the computer system to detect input forms of the vertical and horizontal synchronous signals from the computer system; and the second step of separating the vertical and horizontal synchronous signals from each other in accordance with the input forms detected at the first step and adjusting polarities of the separated vertical and horizontal synchronous signals.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram illustrating the construction of an exemplary monitor;

FIGS. 2A to 2C are waveform diagrams of output signals from a computer system in FIG. 1; wherein:

FIG. 2A shows vertical and horizontal synchronous signals;

FIG. 2B shows a composite synchronous signal; and

FIG. 2C shows a synchronous-on-green signal;

FIGS. 5A to 5D are flowcharts in detail illustrating a synchronous signal detection step in FIG. 4;

FIG. 6 is a block diagram illustrating the construction of a microcomputer in FIG. 3 for performing a synchronous signal separation operation in accordance with the principles of the present invention; and FIGS. 7A to 7C are timing diagrams illustrating the operation of a vertical synchronous signal detector in FIG. 6.

DETAILED DESCRIPTION OF THE PREFERRED EMBODIMENTS

Figure 3:
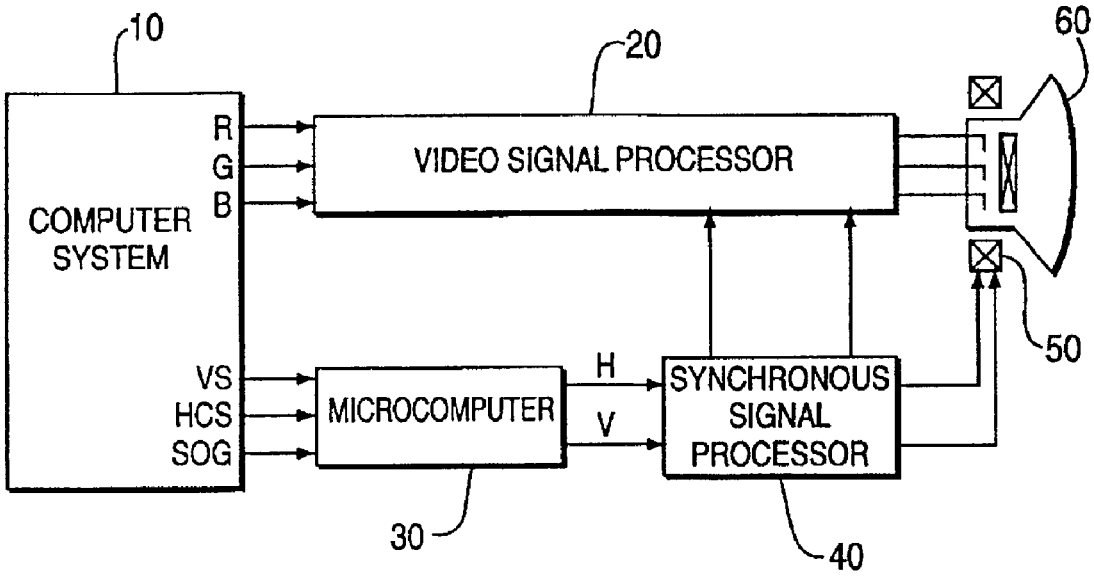
FIG. 3 is a block diagram illustrating the construction of a monitor in accordance with the principles of the present invention.

Referring to FIG. 1, there is shown in block form the construction of an exemplary monitor. In this drawing, reference numeral 1 designates a computer system such as a personal computer. Computer system 1 outputs red, green and blue color signals at its color signal output terminals R, G and B. Also, computer system 1 selectively outputs a vertical synchronous signal V at its vertical synchronous signal terminal VS, a horizontal synchronous signal H or a composite synchronous signal at its horizontal/composite synchronous signal terminal HCS and a synchronous-on-green signal at its synchronous-on-green terminal SOG.

Reference numeral 2 designates a video signal processor. Video signal processor 2 processes the red, green and blue color signals from computer system 1 in response to the vertical and horizontal synchronous signals V and H from computer system 1 and outputs the processed color signals to a cathode ray tube (CRT) 6.

Reference numeral 3 designates a synchronous signal separator. Synchronous signal separator 3 separates the vertical and horizontal synchronous signals V and H from computer system 1 from each other. Namely, when computer system 1 outputs the vertical and horizontal synchronous signals V and H as shown in FIG. 2A at its vertical synchronous signal terminal VS and horizontal/composite synchronous signal terminal HCS, respectively, synchronous signal separator 3 merely adjusts polarities of the vertical and horizontal synchronous signals V and H. On the other hand, when computer system 1 outputs the composite synchronous signal as shown in FIG. 2B at its horizontal/composite synchronous signal terminal HCS or the synchronous-on-green signal as shown in FIG. 2C a its synchronous-on-green terminal SOG, synchronous signal separator 3 separates the composite synchronous signal or the synchronous-on-green signal into the vertical and horizontal synchronous signals V and H and adjusts the polarities of the separated vertical and horizontal synchronous signals V and H.

Reference numeral 4 designates a microcomputer. On the basis of frequencies of the vertical and horizontal synchronous signals V and H separated by synchronous signal separator 3, microcomputer 4 determines that the present mode is a video signal output mode of computer system 1 and controls the monitor in such a manner that it can be operated in the video signal output mode. Also, microcomputer 4 outputs the vertical and horizontal synchronous signals V and H separated by synchronous signal separator 3 to a synchronous signal processor 5.

Synchronous signal processor 5 processes the vertical and horizontal synchronous signals V and H from microcomputer 4 and outputs the processed vertical and horizontal synchronous signals V and H to video signal processor 2. As a result, video signal processor 2 processes the video signal from computer system 1 synchronously with the vertical and horizontal synchronous signals V and H from synchronous signal processor 5.

Further, synchronous signal processor 5 controls a magnetic field of a deflection coil 7 mounted to CRT 6 so that CRT 6 can display a desired picture in response to an output signal from video signal processor 2. In other words, synchronous signal processor 5 performs horizontal position, horizontal size, vertical position, vertical size, side pin cushion, slope, pin balance and top/bottom corrections with respect to the picture which is displayed by CRT 6.

The synchronous signals provided by computer system 1 are classified into the separated vertical and horizontal synchronous signals V and H, the composite synchronous signal and the synchronous-on-green signal. The exemplary monitor comprises synchronous signal separator 3 as hardware means for the separation and polarity adjustment of the synchronous signals from computer system 1.

Referring to FIG. 3, here is shown in block from the construction of a monitor in accordance with the present invention. In this drawing, reference numeral 10 designates a computer system. Computer system 10 outputs red, green and blue color signals at its color signal output terminals R, G and B. Also, computer system 10 selectively outputs a vertical synchronous signal V at its vertical synchronous signal terminal VS, a horizontal synchronous signal H or a composite synchronous signal at its horizontal/composite synchronous signal terminal HCS and a synchronous-on-green signal at its synchronous-on-green terminal SOG.

The monitor comprises a video signal processor 20 for processing the red, green and blue color signals from computer system 10 in response to the vertical and horizontal synchronous signals V and H from computer system 10, a microcomputer 30 for detecting the vertical and horizontal synchronous signals V and H from the vertical synchronous signal terminal VS, horizontal/composite synchronous signal terminal HCS and synchronous-on-green terminal SOG of computer system 10, separating the detected vertical and horizontal synchronous signals V and H from each other and adjusting polarities of the separated vertical and horizontal synchronous signals V and H, and a synchronous signal processor 40 for processing the vertical and horizontal synchronous signals V and H from microcomputer 30 and outputting the processed vertical and horizontal synchronous signals V and H to video signal processor 20 so that video signal processor 20 can process the video signal from computer system 10 synchronously with the vertical and horizontal synchronous signals V and H. Further, synchronous signal processor 40 controls a magnetic field of a deflection coil 50 mounted to a CRT 60. CRT 60 deflects electron beams based on an output signal from video signal processor 20 according to the magnetic field of deflection coil 50 controlled by synchronous signal processor 40 to display a desired picture.

The operation of the monitor with the above-mentioned construction in accordance with the present invention will hereinafter be described in detail.

First, computer system 10 outputs red, green and blue color signals of a desired picture to be displayed, at its color signal output terminals R, G and B. Also, computer system 10 selectively outputs the vertical and horizontal synchronous signals V and H at its vertical synchronous signal terminal VS, horizontal/composite synchronous signal terminal HCS and synchronous-on-green terminal SOG.

Microcomputer 30 scans the vertical synchronous signal terminal VS, horizontal/composite synchronous signal terminal HCS and synchronous-on-green terminal SOG of computer system 10 to check input forms of the vertical and horizontal synchronous signals V and H.

Then, microcomputer 30 separates the vertical and horizontal synchronous signals V and H from each other in accordance with the checked input forms and adjusts the polarities of the separated vertical and horizontal synchronous signals V and H.

Also, microcomputer 30 determines the present operation mode according to frequencies of the separated vertical and horizontal synchronous signals V and H and controls the monitor in such a manner that it can be operated in the determined operation mode.

Synchronous signal processor 40 processes the vertical and horizontal synchronous signals V and H from microcomputer 30 and outputs the processed vertical and horizontal synchronous signals V and H to deflection coil 50 to control the electron beam deflection of CRT 60.

Video signal processor 20 processes the red, green and blue color signals from computer system 10 in response to the vertical and horizontal synchronous signals V and H from synchronous signal processor 40 and outputs the processed color signals to CRT 60 to display the desired picture on CRT 60.

Figure 4:
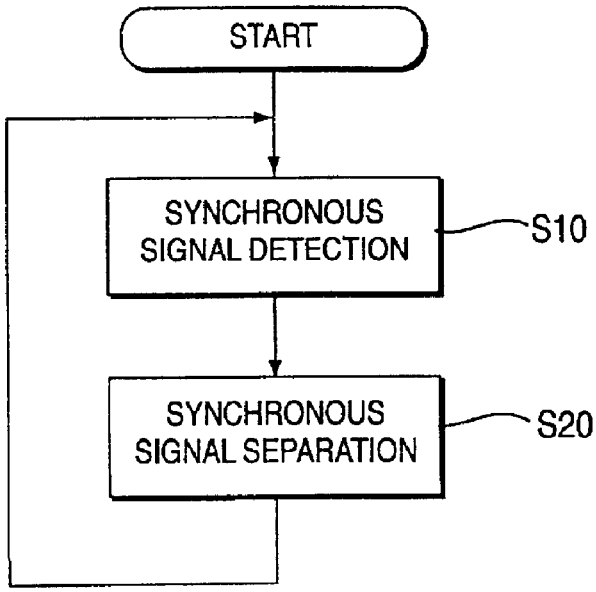
FIG. 4 is a flowchart schematically illustrating a method for detecting and separating vertical and horizontal synchronous signals from a computer system in FIG. 3 in accordance with the principles of the present invention.

FIG. 4 is a flowchart schematically illustrating a method for detecting and separating the vertical and horizontal synchronous signals V and H from computer system 10 in FIG. 3 in accordance with the present invention. First, at step S10, microcomputer 30 scans the vertical synchronous signal terminal VS, horizontal/composite synchronous signal terminal HCS and synchronous-on-green terminal SOG of computer system 10 to detect input forms of the vertical and horizontal synchronous signals V and H. Then, at step S20, microcomputer 30 separates the vertical and horizontal synchronous signals V and H from each other in accordance with the input forms detected at the above step S10 and adjusts the polarities of the separated vertical and horizontal synchronous signals V and H.

FIGS. 5A to 5D are flowcharts in detail illustrating the synchronous signal detection step S10 in FIG. 4. First, in FIG. 5A, microcomputer 30 checks at step S100 whether the horizontal synchronous signal H is input from horizontal/composite synchronous signal terminal HCS. If the horizontal synchronous signal H is not input from horizontal/composite synchronous signal terminal HCS at step S100, microcomputer 30 checks at step S210 of step S200 whether the vertical synchronous signal V is input from vertical synchronous signal terminal VS. If the vertical synchronous signal V is not input from vertical synchronous signal terminal VS at step S210, the microcomputer 30 checks at step S220 of step S200 whether the vertical and horizontal synchronous signals V and H are input from synchronous-on-green terminal SOG.

On the other hand, when the horizontal synchronous signal H is input from horizontal/composite synchronous signal terminal HCS at the above step S100, microcomputer 30 checks at step S300 whether the vertical synchronous signal V is input from vertical synchronous signal terminal VS. If the vertical synchronous signal V is not input from vertical synchronous signal terminal VS at step S300, microcomputer 30 proceeds to step S400 to check whether the composite synchronous signal is input from horizontal/composite synchronous signal terminal HCS.

When the vertical synchronous signal V is input from vertical synchronous signal terminal VS at the above step S300, microcomputer 30 checks the polarity of the horizontal synchronous signal H input from horizontal/composite synchronous signal terminal HCS at step S510 of step S500. In accordance with the polarity checked at step S510, microcomputer 30 proceeds to step S520 or S530 to check whether the composite synchronous signal or the separated vertical and horizontal synchronous signals V and H are input.

At the above step S210, microcomputer 30 checks at step S211 whether the vertical synchronous signal V is input from vertical synchronous signal terminal VS. If the vertical synchronous signal V is input from vertical synchronous signal terminal VS at step S211, microcomputer 30 determines at step S212 that only the vertical synchronous signal V is input from vertical synchronous signal terminal VS with no input of the horizontal synchronous signal H from horizontal/composite synchronous signal terminal HCS. Then, microcomputer 30 performs synchronous signal separation step S20.

On the other hand, when the vertical synchronous signal V is not input from vertical synchronous signal terminal VS at the above step S211, microcomputer 30 proceeds to step S220 to check whether the synchronous-on-green signal is input from synchronous-on-green terminal SOG.

At the above step S220, microcomputer 30 checks at step S221 whether the horizontal synchronous signal H is input from synchronous-on-green terminal SOG. If the horizontal synchronous signal H is not input from synchronous-on-green terminal SOG at step S221, microcomputer 30 determines at step S222 that no synchronous signal is input.

When the horizontal synchronous signal H is input from synchronous-on-green terminal SOG at the above step S221, microcomputer 30 checks at step S223 whether the vertical synchronous signal V is input from synchronous-on-green terminal SOG. If the vertical synchronous signal V is not input from synchronous-on-green terminal SOG at step S223, microcomputer 30 determines at step S224 that only the horizontal synchronous signal H is input from synchronous-on-green terminal SOG with no input of the vertical synchronous signal V. Then, microcomputer 30 performs synchronous signal separation step S20.

However, if the vertical synchronous signal V is input from synchronous-on-green terminal SOG at the above step S223, minicomputer 30 determines at step S225 that the vertical and horizontal synchronous signals V and H are together input from synchronous-on-green terminal SOG and the polarities thereof are both positive. Then, microcomputer 30 performs synchronous signal separation step S20.

Figure 5B:
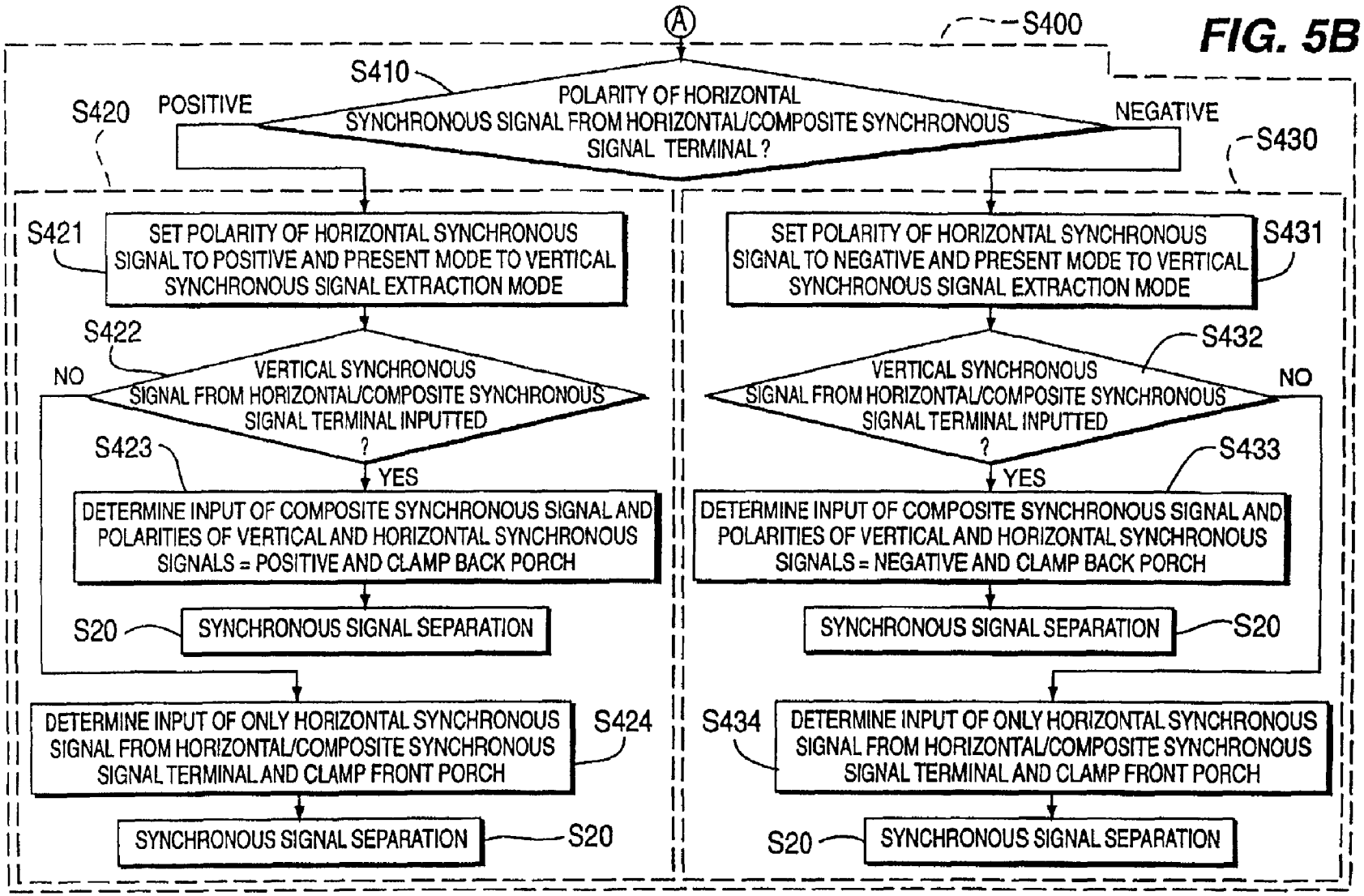

At the above step S400 of checking whether the composite synchronous signal is input from the horizontal/composite synchronous signal terminal HCS, as shown in FIG. 5B, microcomputer 30 checks the polarity of the horizontal synchronous signal H input from horizontal/composite synchronous signal terminal HCS at step S410. If the polarity checked at the above step 410 is positive, microcomputer 30 performs a first composite synchronous signal detection operation at step S420. To the contrary, if the polarity checked at the above step S410 is negative, microcomputer 30 performs a second composite synchronous signal detection operation at step S430.

At the above step S420 of performing the first composite synchronous signal detection operation, microcomputer 30 sets the polarity of the horizontal synchronous signal H to positive at step S421. Also, microcomputer 30 sets the present mode to a vertical synchronous signal extraction mode. Then, microcomputer 30 checks at step S422 whether the vertical synchronous signal V is input from horizontal/composite synchronous signal terminal HCS.

When the vertical synchronous signal V is input from horizontal/composite synchronous signal terminal HCS at the above step S422, microcomputer 30 determines at step S423 that the composite synchronous signal is input from horizontal/composite synchronous signal terminal HCS and the polarities of the vertical and horizontal synchronous signals V and H are both positive. Then, microcomputer 30 clamps a back porch of the horizontal synchronous signal H to a reference level of the picture to be displayed on CRT 60 and performs synchronous signal separation step S20.

However, when the vertical synchronous signal V is not input from horizontal/composite synchronous signal terminal HCS at the above step S422, microcomputer 30 determines at step S424 that only the horizontal synchronous signal H is input from horizontal/composite synchronous signal terminal HCS. Then, microcomputer 30 clamps a front porch of the horizontal synchronous signal H to the reference level of the picture to be displayed on CRT 60 and performs synchronous signal separation step S20.

At the above step S430 of performing the second composite synchronous signal detection operation, microcomputer 30 sets the polarity of the horizontal synchronous signal H to negative at step S431. Also, microcomputer 30 sets the present mode to the vertical synchronous signal extraction mode. Then, microcomputer 30 checks at step S432 whether the vertical synchronous signal V is input from horizontal/composite synchronous signal terminal HCS.

When the vertical synchronous signal V is input from horizontal/composite synchronous signal terminal HCS at the above step S432, microcomputer 30 determines at step S433 that the composite synchronous signal is input from horizontal/composite synchronous signal terminal HCS and the polarities of the vertical and horizontal synchronous signals V and H are both negative. Then, microcomputer 30 clamps the back porch of the horizontal synchronous signal H to the reference level of the picture to be displayed on CRT 60 and performs synchronous signal separation step S20.

However, when the vertical synchronous signal V is not input from horizontal/composite synchronous signal terminal HCS at the above step S432, microcomputer 30 determines at step S434 that only the horizontal synchronous signal H is input from horizontal/composite synchronous signal terminal HCS. Then, microcomputer 30 clamps the front porch of the horizontal synchronous signal H to the reference level of the picture to be displayed on CRT 60 and performs synchronous signal separation step S20.

Figure 5C:
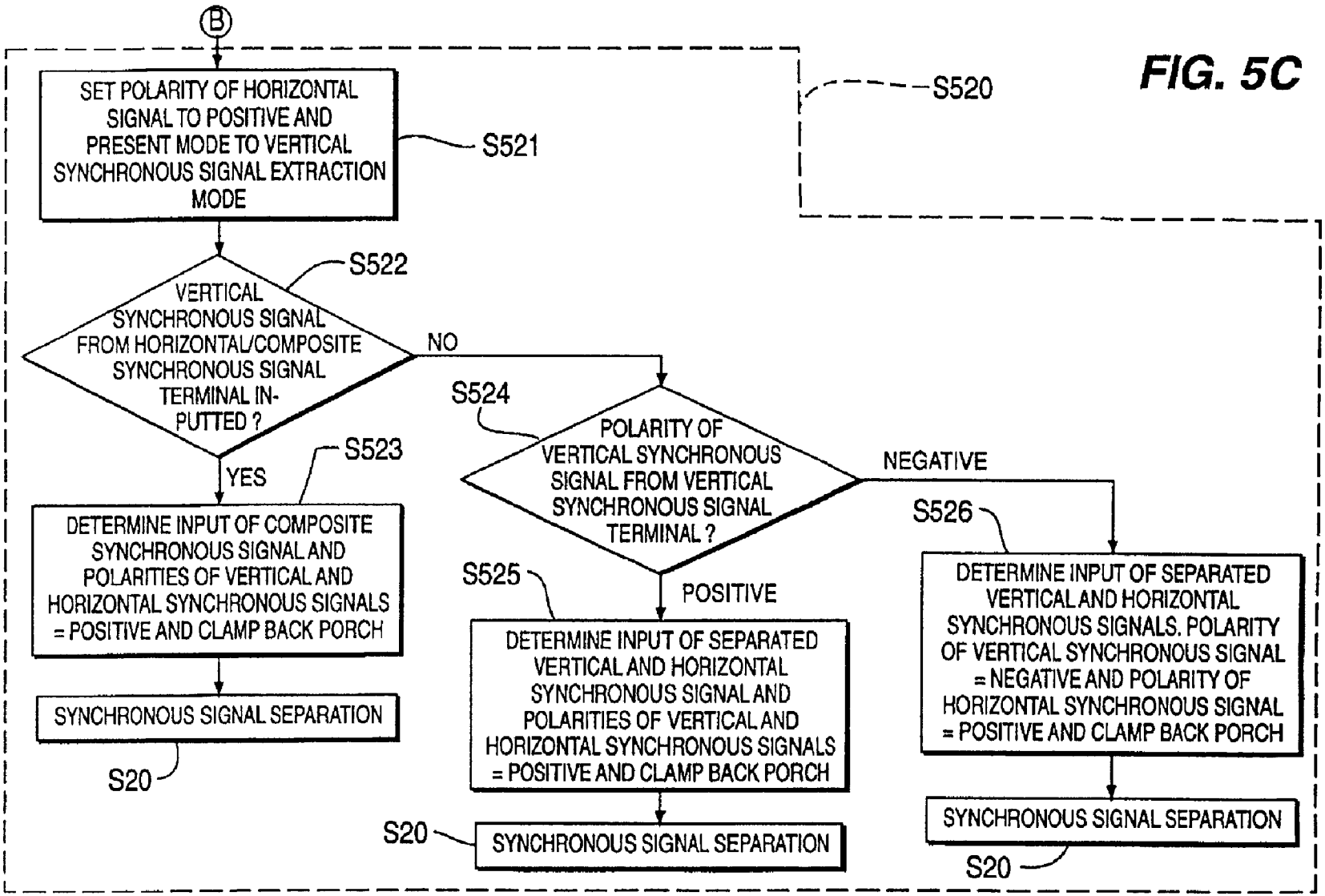

At the above step S520 of checking whether the composite synchronous signal or the separated vertical and horizontal synchronous signals V and H are input under the condition that the polarity of the horizontal synchronous signal H checked at step S510 is positive, as shown in FIG. 5C, microcomputer 30 sets the polarity of the horizontal synchronous signal H to positive at step S521. Also, microcomputer 30 sets the present mode to the vertical synchronous signal extraction mode. Then, microcomputer 30 checks at step S522 whether the vertical synchronous signal V is input from horizontal/composite synchronous signal terminal HCS.

When the vertical synchronous signal V is input from horizontal/composite synchronous signal terminal HCS at the above step S522, microcomputer 30 determines at step S523 that the composite synchronous signal is input from horizontal/composite synchronous signal terminal HCS and the polarities of the vertical and horizontal synchronous signals V and H are both positive. Then, microcomputer 30 clamps the back porch of the horizontal synchronous signal H to the reference level of the picture to be displayed on CRT 60 and performs synchronous signal separation step S20.

However, when the vertical synchronous signal V is not input from horizontal/composite synchronous signal terminal HCS at the above step S522, microcomputer 30 checks the polarity of the vertical synchronous signal V input from vertical synchronous signal terminal VS at step S524.

If the polarity of the vertical synchronous signal V checked at the above step S524 is positive, microcomputer 30 determines at step S525 that the separated vertical and horizontal synchronous signals V and H are input and the polarities thereof are both positive. Then, microcomputer 30 clamps the back porch of the horizontal synchronous signal H to the reference level of the picture to be displayed on CRT 60 and performs synchronous signal separation step S20.

When the polarity of the vertical synchronous signal V checked at the above step S524 is negative, microcomputer 30 determines at step S526 that the separated vertical and horizontal synchronous signals V and H are input, the polarity of the vertical synchronous signal V is negative and the polarity of the horizontal synchronous signal H is positive. Then, microcomputer 30 clamps the front porch of the horizontal synchronous signal H to the reference level of the picture to be displayed on CRT 60 and performs synchronous signal separation step S20.

Figure 5D:
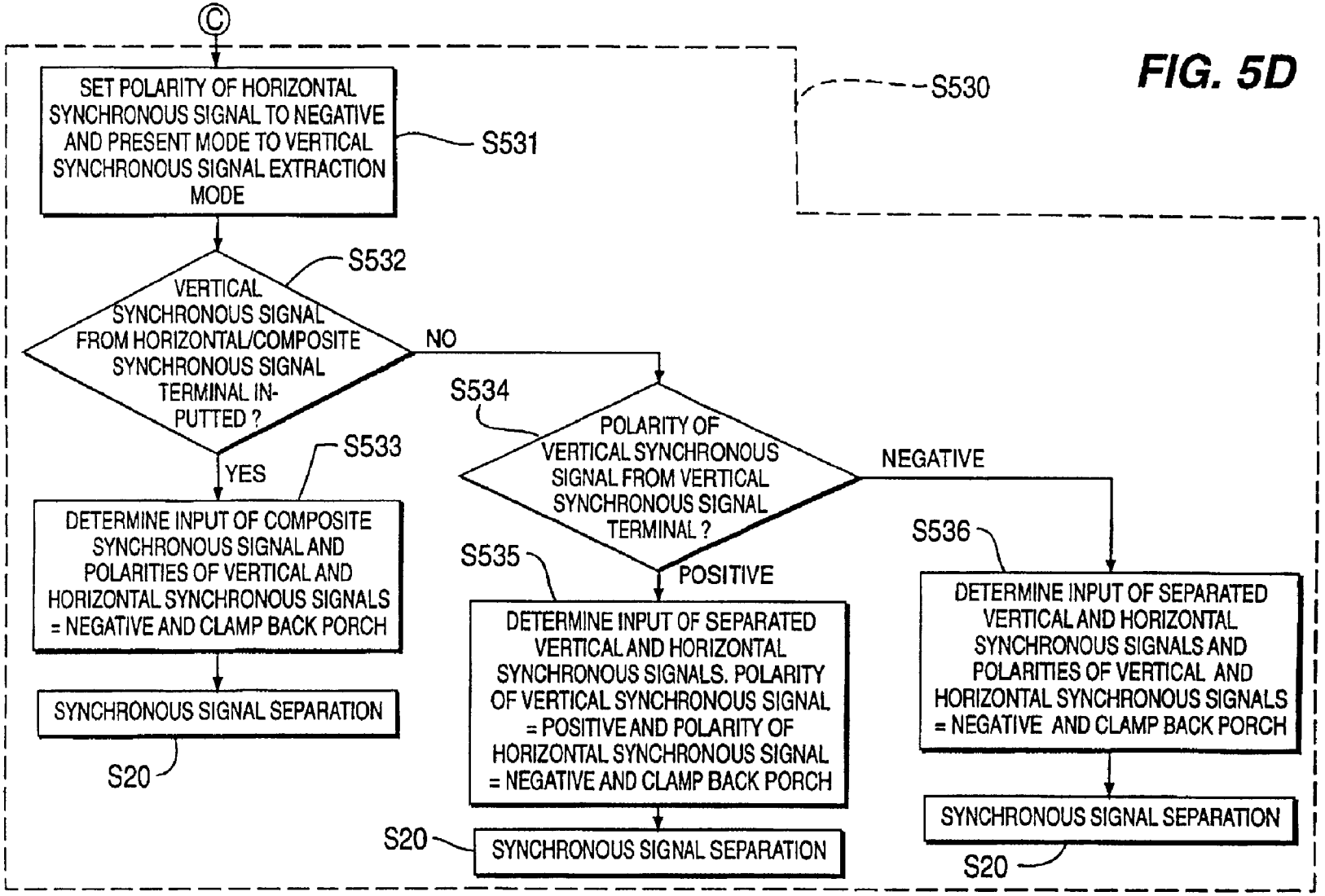

At the above step S530 of checking whether the composite synchronous signal or the separated vertical and horizontal synchronous signals V and H are input under the condition that the polarity of the horizontal synchronous signal H checked at step S510 is negative, as shown in FIG. 5D, microcomputer 30 sets the polarity of the horizontal synchronous signal H to negative at step S531. Also, microcomputer 30 sets the present mode to the vertical synchronous signal extraction mode. Then, microcomputer 30 checks at step S532 whether the vertical synchronous signal V is input from horizontal/composite synchronous signal terminal HCS.

When the vertical synchronous signal V is input from horizontal/composite synchronous signal terminal HCS at the above step S532, microcomputer 30 determines at step S533 that the composite synchronous signal is input from horizontal/composite synchronous signal terminal HCS and the polarities of the vertical and horizontal synchronous signals V and H are both negative. Then, microcomputer 30 clamps the back porch of the horizontal synchronous signal H to the reference level of the picture to be displayed on CRT 60 and performs synchronous signal separation step S20.

However, when the vertical synchronous signal V is not input from horizontal/composite synchronous signal terminal HCS at the above step S532, microcomputer 30 checks the polarity of the vertical synchronous signal V input from vertical synchronous signal terminal VS at step S534.

If the polarity of the vertical synchronous signal V checked at the above step S534 is positive, microcomputer 30 determines at step S535 that the separated vertical and horizontal synchronous signals V and H are input, the polarity of the vertical synchronous signal V is positive and the polarity of the horizontal synchronous signal H is negative. Then, microcomputer 30 clamps the [front] *back* porch of the horizontal synchronous signal H to the reference level of the picture to be displayed on CRT 60 and performs synchronous signal separation step S20.

When the polarity of the vertical synchronous signal V checked at the above step S534 is negative, microcomputer 30 determines at step S536 that the separated vertical and horizontal synchronous signals V and H are input and the polarities thereof are both negative. Then, microcomputer 30 clamps the [front] *back* porch of the horizontal synchronous signal H to the reference level of the picture to be displayed on CRT 60 and performs synchronous signal separation step S20.

FIG. 6 is a block diagram illustrating the construction of microcomputer 30 on FIG. 3 for performing the synchronous signal separation operation in accordance with the present invention. As shown in this drawing, microcomputer 30 includes a multiplexer 75 for selecting one of the horizontal synchronous signal H or the composite synchronous signal from horizontal/composite synchronous signal terminal HCS and the synchronous-on-green signal from synchronous-on-green terminal SOG in response to a control signal C1, a vertical synchronous signal detector 71 for detecting the vertical synchronous signal V from an output signal from multiplexer 75, a multiplexer 76 for selecting the vertical synchronous signal V from vertical synchronous signal terminal VS or from vertical synchronous signal detector 71 in response to a control signal C2, a vertical synchronous signal polarity adjustment unit 72 for adjusting the polarity of the vertical synchronous signal V from multiplexer 76, a horizontal synchronous signal polarity adjustment unit 73 for adjusting the polarity of the horizontal synchronous signal H from multiplexer 76, a synchronous signal oscillator 74 for generating reference vertical and horizontal synchronous signals Vref and Href, a multiplexer 77 for selecting the vertical synchronous signal V from vertical synchronous signal polarity adjustment unit 72 or the reference vertical synchronous signal Vref from synchronous signal oscillator 74 in reasons to a control signal C3, and a multiplexer 78 for selecting the horizontal synchronous signal H from horizontal synchronous signal polarity adjustment unit 73 or the reference horizontal synchronous signal Href from synchronous signal oscillator 74 in response to control signal C3.

The synchronous signal separation operation of microcomputer 30 with the above-mentioned construction in accordance with the present invention will hereinafter be described in detail on the basis of the input forms of the vertical and horizontal synchronous signals V and H.

1) When separate vertical and horizontal synchronous signals V and H are input

In this case, the vertical synchronous signal V is input from vertical synchronous signal terminal VS and the horizontal synchronous signal H is input from horizontal/composite synchronous signal terminal HCS. Multiplexer 75 selects the horizontal synchronous signal H from horizontal/composite synchronous signal terminal HCS in response to control signal C1 and multiplexer 76 selects the vertical synchronous signal V from vertical synchronous signal terminal VS in response to control signal C2. Also, third and fourth multiplexers 77 and 78 select the output signal from vertical and horizontal synchronous signal polarity adjustment units 72 and 73 in response to control signal C3, respectively As a result, the vertical synchronous signal V from vertical synchronous signal terminal VS is selected by multiplexer 76, adjusted in polarity by vertical synchronous signal polarity adjustment unit 72 and then output through multiplexer 77. Also, the horizontal synchronous signal H from horizontal/composite synchronous signal terminal HCS is selected by multiplexer 75, adjusted in polarity by horizontal synchronous signal polarity adjustment unit 73 and then output through multiplexer 78.

2) When the composite synchronous signal is input

In this case, the composite synchronous signal is input from horizontal/composite synchronous signal terminal HCS. Multiplexer 75 selects the composite synchronous signal from horizontal/composite synchronous signal terminal HCS in response to control signal C1 and multiplexer 76 selects the output signal from vertical synchronous signal detector 71 in response to control signal C2. Also, multiplexers 77 and 78 select the output signals from vertical and horizontal synchronous signal polarity adjustment units 72 and 73 in response to control signal C3, respectively.

As a result, the composite synchronous signal from horizontal/composite synchronous signal terminal HCS is selected by multiplexer 75 and then applied to vertical synchronous signal detector 71, which detects the vertical synchronous signal V from the composite synchronous signal.

Noticeably, vertical synchronous signal detector 71 can detect the vertical synchronous signal V from the composite synchronous signal in various manners. In the preferred embodiment of the present invention, vertical synchronous signal detector 71 utilizes a 5-bit counter to detect the vertical synchronous signal V from the composite synchronous signal, as will hereinafter be described in detail.

When multiplexer 75 selects the composite synchronous signal as shown in FIG. 7A from horizontal/composite synchronous signal terminal HCS, vertical synchronous signal detector 71 up-counts a clock signal (not shown) for a high level duration of the composite synchronous signal and down-counts the clock signal for a low level duration of the composite synchronous signal, as shown in FIG. 7B.

Vertical synchronous signal detector 71 generates a count within the range of "00000" to "11111". At his time, no underflow occurs when the count is below "00000" and no overflow occurs when the count is above "11111". Vertical synchronous signal detector 71 outputs a high level signal when the count is "11111".

In result, as shown in FIG. 7C, vertical synchronous signal detector 71 outputs a low level signal for a narrow pulse width interval of the horizontal synchronous signal H of the composite synchronous signal from multiplexer 75 because the count is below "11111" and a high level signal for a wide pulse width interval of the vertical synchronous signal V of the composite synchronous signal because the count is "11111".

The vertical synchronous signal V detected by vertical synchronous signal detector 71 is selected by multiplexer 76, adjusted to polarity by vertical synchronous signal polarity adjustment unit 72 and then output through multiplexer 77.

On the other hand, the composite synchronous signal from horizontal/composite synchronous signal terminal HCS is used directly as the horizontal synchronous signal H. As a result, the composite synchronous signal from horizontal/composite synchronous signal terminal HCS is selected by multiplexer 75, adjusted in polarity by horizontal synchronous signal polarity adjustment unit 73 and then output as the horizontal synchronous signal H through multiplexer 78.

3) When the synchronous-on-green signal is input

In this case, the synchronous-on-green signal is input from synchronous-on-green terminal SOG. Multiplexer 75 selects the synchronous-on-green signal from synchronous-on-green terminal SOG in response to control signal C1 and multiplexer 76 selects the output signal from vertical synchronous signal detector 71 in response to control signal C2. Also, multiplexers 77 and 78 select the output signals from vertical and horizontal synchronous signal polarity adjustment units 72 and 73 in response to control signal C3, respectively.

As a result, the synchronous-on-green signal from synchronous-on-green terminal SOG is selected by multiplexer 75 and then applied to vertical synchronous signal detector 71, which detects the vertical synchronous signal V from the synchronous-on-green signal in a similar manner to the case where the composite synchronous signal is input.

The vertical synchronous signal V detects by vertical synchronous signal detector 71 is selected by multiplexer 76, adjusted in polarity by vertical synchronous signal polarity adjustment unit 72 and then output through multiplexer 77.

Also, the synchronous-on-green signal from synchronous-on-green terminal SOG is selected by multiplexer 75, adjusted in polarity by horizontal synchronous signal polarity adjustment unit 73 and then output as the horizontal synchronous signal H through multiplexer 78.

4) When no Synchronous signal is input

In this case, microcomputer 30 outputs separate vertical and horizontal synchronous signals. In other words, synchronous signal oscillator 74 is operated, and multiplexers 77 and 78 select the output signals from synchronous oscillator 74 are output through multiplexers 77 and 78, respectively.

As apparent from the above description, according to the present invention, the input forms of the vertical and horizontal synchronous signals from the computer system are discriminated in the software manner employing the microcomputer. In accordance with the discriminated input forms, the vertical and horizontal synchronous signals are separated from each other and then adjusted in polarity. Therefore, the present invention requires no separate hardware for the separation and polarity adjustment of the vertical and horizontal synchronous signals, resulting in simplification in circuit construction and reductions in number of used components and size of a printed circuit board.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

I claim:

[1. A method for detecting and separating vertical and horizontal synchronous signals received by a monitor from a computer, comprising the steps of:

a checking for inputs from a vertical synchronous signal terminal, a horizontal/composite synchronous signal terminal and a synchronous-on-green terminal of said computer to detect input forms of the vertical and horizontal synchronous signals from said computer;

generating reference vertical and horizontal synchronous signals when no input is detected during said step of checking for inputs from said vertical synchronous signal terminal, said horizontal/composite synchronous signal terminal and said synchronous-on-green terminal of said computer;

performing synchronous signal separation in accordance with the input forms detected during said step of checking, and adjusting polarities of the separated vertical and horizontal synchronous signals.]

2. A method for detecting vertical and horizontal synchronous signals received by a monitor from a computer, comprising the steps of:

checking a horizontal/composite synchronous signal terminal to determine whether the horizontal synchronous signal is input;

checking a vertical synchronous terminal to determine whether the vertical synchronous signal is input, when it is determined that the horizontal synchronous signal is not input from said horizontal/composite synchronous signals terminal;

checking a synchronous-on-green terminal to determine whether said horizontal synchronous signal is input, when it is determined that the vertical synchronous signal is not input from said vertical synchronous signal terminal; and making a determination that no synchronous signal has been input, generating reference vertical and horizontal synchronous signals and returning to said step of checking said horizontal/composite synchronous signal terminal, when it is determined that the horizontal synchronous signal is not input from said synchronous-on-green terminal.

3. The method as set forth in claim 2, further comprising the steps of:

checking said vertical synchronous signal terminal to determine whether the vertical synchronous signal is input, when it is determined that the horizontal synchronous signal is input from said horizontal/composite synchronous signal terminal;

determining whether said horizontal synchronous signal has a positive polarity or a negative polarity, when it is determined that the horizontal synchronous signal is input from said horizontal/composite synchronous signal terminal and the vertical synchronous signal is not input from said vertical synchronous signal terminal;

setting the polarity of said horizontal synchronous signal to positive and beginning a vertical synchronous signal extraction mode, when it is determined that said horizontal synchronous signal has a positive polarity;

checking said horizontal/composite synchronous signal terminal to determine whether the vertical synchronous signal is input;

making a determination that only the horizontal synchronous signal is input from said horizontal/composite synchronous signal terminal and performing a corresponding synchronous signal separation process, when it is determined that said vertical synchronous signal is not input from said horizontal/composite synchronous signal terminal; and making a determination that a composite synchronous signal is input from said horizontal/composite synchronous signal terminal, that the polarity of said horizontal and vertical synchronous signals are both positive and performing a corresponding synchronous signal separation process, when it is determined that said vertical synchronous signal is input from said horizontal/composite synchronous signal terminal.

4. The method as set forth in claim 3, further comprising the steps of:

setting the polarity of said horizontal synchronous signal to negative and beginning a vertical synchronous signal extraction mode, when it is determined that said horizontal synchronous signal has a negative polarity;

checking said horizontal/composite synchronous signal terminal to determine whether the vertical synchronous signal is input;

making a determination that only the horizontal synchronous signal is input from said horizontal/composite synchronous signal terminal and performing a corresponding synchronous signal separation process, when it is determined that said vertical synchronous signal is not input from said horizontal/composite synchronous signal terminal; and making a determination that a composite synchronous signal is input from said horizontal/composite synchronous signal terminal, that the polarity of said horizontal and vertical synchronous signals are both negative and performing a corresponding synchronous signal separation process, when it is determined that said vertical synchronous signal is input from said horizontal/composite synchronous signal terminal.

5. The method as set forth in claim 3, further comprising the steps of:

determining whether said horizontal synchronous signal has a positive polarity or a negative polarity, when it is determined that the horizontal synchronous signal is input from said horizontal/composite synchronous signal terminal and the vertical synchronous signal is input from said vertical synchronous signal terminal;

setting the polarity of said horizontal synchronous signal to positive and beginning a vertical synchronous signal extraction mode, when it is determined that said horizontal synchronous signal has a positive polarity;

checking said horizontal/composite synchronous signal terminal to determine whether the vertical synchronous signal is input; and making a determination that a composite synchronous signal is input from said horizontal/composite synchronous signal terminal, that the polarity of said horizontal and vertical synchronous signals are both positive and performing a corresponding synchronous signal separation process, when it is determined that said vertical synchronous signal is input from said horizontal/composite synchronous signal terminal.

6. The method as set forth in claim 5, further comprising the steps of:

determining whether said vertical synchronous signal from said vertical synchronous signal terminal has a positive polarity or a negative polarity, when it is determined that said vertical synchronous signal is not input from said horizontal/composite synchronous signal terminal;

making a determination that separate horizontal and vertical synchronous signal are input, that said horizontal and vertical synchronous signals have a positive polarity and performing a corresponding synchronous signal separation process, when it is determined that said vertical synchronous signal from said vertical synchronous signal terminal has a positive polarity; and making a determination that separate horizontal and vertical synchronous signals are input, that said horizontal synchronous signal has a positive polarity, that said vertical synchronous signal has a negative polarity and performing a corresponding synchronous signal separation process, when it is determined that said vertical synchronous signal from said vertical synchronous signal terminal has a negative polarity.

7. The method as set forth in claim 5, further comprising the steps of:

setting the polarity of said horizontal synchronous signal to negative and beginning a vertical synchronous signal extraction mode, when it is determined that said horizontal synchronous signal has a negative polarity, checking said horizontal/composite synchronous signal terminal to determine whether the vertical synchronous signal is input; and making a determination that a composite synchronous signal is input from said horizontal/composite synchronous signal terminal, that the polarity of said horizontal and vertical synchronous signals are both negative and performing a corresponding synchronous signal separation process, when it is determined that said vertical synchronous signal is input from said horizontal/composite synchronous signal terminal.

8. The method as set forth in claim 7, further comprising the steps of:

determining whether said vertical synchronous signal from said vertical synchronous signal terminal has a positive polarity or a negative polarity, when it is determined that said vertical synchronous signal is not input from said horizontal/composite synchronous signal terminal;

making a determination that separate horizontal and vertical synchronous signals are input, that said horizontal synchronous signal has a negative polarity, that said vertical synchronous signals has a positive polarity and performing a corresponding synchronous signal separation process, when it is determined that said vertical synchronous signal from said vertical synchronous signal terminal has a positive polarity; and making a determination that separate horizontal and vertical synchronous signals are input, that said horizontal and vertical synchronous signal have a negative polarity and performing a corresponding synchronous signal separation process, when it is determined that said vertical synchronous signal from said vertical synchronous signal terminal has a negative polarity.

9. The method as set forth in claim 2, further comprising the steps of:

making a determination that only the vertical synchronous signal has been input when it is determined that said vertical synchronous signal is input from said vertical synchronous signal terminal; and performing a corresponding synchronous signal separation process.

10. The method as set forth in claim 2, further comprising the steps of:

checking for input of said vertical synchronous signal from said synchronous-on-green terminal, when it is determined that said horizontal synchronous signal is input from said synchronous-on-green terminal;

making a determination that only the horizontal synchronous signal has been input from said synchronous-on-green terminal and performing a corresponding synchronous separation process, when it is determined that said vertical synchronous signal is not input from said synchronous-on-green terminal; and making a determination that the vertical and horizontal synchronous signals are input from said synchronous-on-green terminal, setting the polarity of said vertical and horizontal synchronous signals to positive and performing a corresponding synchronous signal separation process, when it is determined that said vertical synchronous signal is input from said synchronous-on-green terminal.

11. The method as set forth in claim 3, wherein said step of making a determination that only the horizontal synchronous signal is input from said horizontal/composite synchronous signal terminal and performing a corresponding synchronous signal separation process further comprises a step of clamping a front porch of the horizontal synchronous signal to a reference level.

12. The method as set forth in claim 3, wherein said step of making a determination that a composite synchronous signal is input from said horizontal/composite synchronous signal terminal, that the polarity of said horizontal and vertical synchronous signals are both positive and performing a corresponding synchronous signal separation process further comprises a step of clamping a back porch of the horizontal synchronous signal to a reference level.

13. The method as set forth in claim 4, wherein said step of making a determination that only the horizontal synchronous signal is input from said horizontal/composite synchronous signal terminal and performing a corresponding synchronous signal separation process further comprises a step of clamping a front porch of the horizontal synchronous signal to a reference level.

14. The method as set froth in claim 4, wherein said step of making a determination that a composite synchronous signal is input from said horizontal/composite synchronous signal terminal, that the polarity of said horizontal and vertical synchronous signals are both negative and performing a corresponding synchronous signal separation process further comprises a step of clamping a back porch of the horizontal synchronous signal to a reference level.

15. The method as set forth in claim 5, wherein said step of making a determination that a composite synchronous signal is input from said horizontal/composite synchronous signal terminal, that the polarity of said horizontal and vertical synchronous signals are both positive and performing a corresponding synchronous signal separation process further comprises a step of clamping a back porch of the horizontal synchronous signal to a reference level.

16. The method as set forth in claim 6, wherein said step of making a determination that separate horizontal and vertical synchronous signals are input, that said horizontal and vertical synchronous signals have a positive polarity and performing a corresponding synchronous signal separation process further comprises a step of clamping a back porch of the horizontal synchronous signal to a reference level.

17. The method as set forth in claim 6, wherein said step of making a determination that separate horizontal and vertical synchronous signals are input, that said horizontal synchronous signal has a positive polarity, that said vertical synchronous signal has a negative polarity and performing a corresponding synchronous signal separation process further comprises a step of clamping a front porch of the horizontal synchronous signal to a reference level.

18. The method as set forth in claim 7, wherein said step of making a determination that a composite synchronous signal is input from said horizontal/composite synchronous signal terminal, that the polarity of said horizontal and vertical synchronous signals are both negative and performing a corresponding synchronous signal separation process further comprises a step of clamping a back porch of the horizontal synchronous signal to a reference level.

19. The method as set forth in claim 8, wherein said step of making a determination that separate horizontal and vertical synchronous signals are input, that said horizontal synchronous signal has a negative polarity, that said vertical synchronous signals has a positive polarity and performing a corresponding synchronous signal separation process further comprises a step of clamping a front porch of the horizontal synchronous signal to a reference level.

20. The method as set forth in claim 8, wherein said step of making a determination that separate horizontal and vertical synchronous signals are input, that said horizontal and vertical synchronous signals have a negative polarity and performing a corresponding synchronous signal separation process further comprises a step of clamping a front porch of the horizontal synchronous signal to a reference level.

[21. A method for detecting and separating vertical and horizontal synchronous signals received by a monitor from a computer, comprising the steps of:

checking for inputs from a vertical synchronous signal terminal, a horizontal/composite synchronous signal terminal and a synchronous-on-green terminal of said computer to detect input forms of the vertical and horizontal synchronous signals from said computer;

generating reference vertical and horizontal synchronous signals when no input is detected during said step of checking for inputs from said vertical synchronous signal terminal, said horizontal/composite synchronous signal terminal and said synchronous-on-green terminal of said computer; and performing synchronous signal separation in accordance with the input forms detected during said step of checking and adjusting polarities of the separated vertical and horizontal synchronous signals.]

*22. The method as set forth in claim 5, further comprising:*

*determining whether said vertical synchronous signal from said vertical synchronous signal terminal has a positive polarity or a negative polarity when it is determined that said horizontal synchronous signal has a positive polarity; and*

*making a determination that separate horizontal and vertical synchronous signal are input, that said horizontal and vertical synchronous signals have a positive polarity; and*

*clamping a back porch of the horizontal synchronous signal to a reference level when it is determined that said vertical synchronous signal from said vertical synchronous signal terminal has a positive polarity.*

*23. The method as set forth in claim 5, further comprising:*

*determining whether said vertical synchronous signal from said vertical synchronous signal terminal has a positive polarity or a negative polarity when it is determined that said horizontal synchronous signal has a positive polarity; and*

*making a determination that separate horizontal and vertical synchronous signal are input, that said horizontal synchronous signal has a positive polarity and said vertical synchronous signal has a negative polarity; and*

*clamping a back porch of the horizontal synchronous signal to a reference level when it is determined that said vertical synchronous signal from said vertical synchronous signal terminal has a negative polarity.*

*24. The method as set forth in claim 5, further comprising:*

*determining whether said vertical synchronous signal from said vertical synchronous signal terminal has a positive polarity or a negative polarity when it is determined that said horizontal synchronous signal has a negative polarity; and*

*making a determination that separate horizontal and vertical synchronous signal are input, that said horizontal synchronous signal has a negative polarity and said vertical synchronous signal has a positive polarity; and*

*clamping a back porch of the horizontal synchronous signal to a reference level when it is determined that said vertical synchronous signal from said vertical synchronous signal terminal has a positive polarity.*

*25. The method as set forth in claim 5, further comprising steps of:*

*determining whether said vertical synchronous signal from said vertical synchronous signal terminal has a positive polarity or a negative polarity when it is determined that said horizontal synchronous signal has a negative polarity; and*

*making a determination that separate horizontal and vertical synchronous signal are input, that said horizontal and vertical synchronous signals have a negative polarity; and*

*clamping a back porch of the horizontal synchronous signal to a reference level when it is determined that said vertical synchronous signal from said vertical synchronous signal terminal has a negative polarity.*

*26. An apparatus for detecting and separating horizontal and vertical synchronous signals received by a monitor from a computer, comprising:*

*a microcomputer connected to a vertical synchronous signal terminal, a horizontal/composite synchronous signal terminal and a synchronous-on-green terminal of*

*said computer to detect inputs of said horizontal and vertical synchronous signals from said computer; and*

*said microcomputer generating reference vertical and horizontal synchronous signals when no input is received from said vertical synchronous signal terminal, said horizontal/composite synchronous signal terminal and said synchronous-on-green terminal of said computer;*

*said microcomputer is further configured to adjust polarities of the separated vertical and horizontal synchronous signals, clamping a back porch portion of the horizontal synchronous signal to a predetermined reference level and outputting separated horizontal and vertical synchronous signals.*

*27. The apparatus as set forth in claim 26, wherein:*

*said microcomputer is further configured to determine whether the vertical synchronous signal is received via the vertical synchronous signal terminal when said microcomputer detects a horizontal synchronous signal input from said horizontal/composite synchronous signal terminal;*

*said microcomputer is further configured to determine whether said horizontal synchronous signal has a positive polarity or a negative polarity, when it is determined that the vertical synchronous signal is input from said vertical synchronous signal terminal;*

*said microcomputer is further configured to determine whether said vertical synchronous signal from said vertical synchronous signal terminal has a positive polarity or a negative polarity, when it is determined that said horizontal synchronous signal has a positive polarity;*

*said microcomputer is further configured to make a determination that separate horizontal and vertical synchronous signal are input, that said horizontal and vertical synchronous signals have a positive polarity and clamping said back porch of the horizontal synchronous signal to the reference level, when it is determined that said vertical synchronous signal from said vertical synchronous signal terminal has a positive polarity; and*

*said microcomputer is further configured to output said separated horizontal and vertical synchronous signals after clamping the back porch of the horizontal synchronous signal to said reference level.*

*28. The apparatus as set forth in claim 26, wherein:*

*said microcomputer is further configured to determine whether the vertical synchronous signal is received via the vertical synchronous signal terminal when said microcomputer detects a horizontal synchronous signal input from said horizontal/composite synchronous signal terminal;*

*said microcomputer is further configured to determine whether said horizontal synchronous signal has a positive polarity or a negative polarity, when it is determined that the vertical synchronous signal is input from said vertical synchronous signal terminal;*

*said microcomputer is further configured to determine whether said vertical synchronous signal from said vertical synchronous signal terminal has a positive polarity or a negative polarity, when it is determined that said horizontal synchronous signal has a positive polarity;*

*said microcomputer is further configured to make a determination that separate horizontal and vertical synchronous signal are input, that said horizontal synchronous signal has a positive polarity and said vertical synchronous signal has a negative polarity and clamping said back porch of the horizontal synchronous signal to the reference level, when it is determined that said vertical synchronous signal from said vertical synchronous signal terminal has a negative polarity; and*

*said microcomputer is further configured to output said separated horizontal and vertical synchronous signals after clamping the back porch of the horizontal synchronous signal to said reference level.*

*29. The apparatus as set forth in claim 26, wherein:*

*said microcomputer is further configured to determine whether said horizontal synchronous signal has a positive polarity or a negative polarity, when it is determined that the vertical synchronous signal is input from said vertical synchronous signal terminal;*

*said microcomputer is further configured to determine whether said vertical synchronous signal from said vertical synchronous signal terminal has a positive polarity or a negative polarity, when it is determined that said horizontal synchronous signal has a negative polarity;*

*said microcomputer is further configured to make a determination that separate horizontal and vertical synchronous signal are input, that said horizontal and vertical synchronous signals have a negative polarity and clamping the back porch of the horizontal synchronous signal to a reference level when it is determined that said vertical synchronous signal from said vertical synchronous signal terminal has a negative polarity; and*

*said microcomputer is further configured to output said separated horizontal and vertical synchronous signals after clamping the back porch of the horizontal synchronous signal to said reference level.*

*30. The apparatus as set forth in claim 26, wherein:*

*said microcomputer is further configured to determine whether said horizontal synchronous signal has a positive polarity or a negative polarity when it is determined that the vertical synchronous signal is input from said vertical synchronous signal terminal;*

*said microcomputer is further configured to determine whether said vertical synchronous signal from said vertical synchronous signal terminal has a positive polarity or a negative polarity, when it is determined that said horizontal synchronous signal has a negative polarity;*

*said microcomputer is further configured to make a determination that separate horizontal and vertical synchronous signal are input, that said horizontal synchronous signal has a negative polarity and said vertical synchronous signal has a positive polarity and clamping the back porch of the horizontal synchronous signal to the reference level when it is determined that said vertical synchronous signal from said vertical synchronous signal terminal has a positive polarity; and*

*said microcomputer is further configured to output said separated horizontal and vertical synchronous signals after clamping the back porch of the horizontal synchronous signal to said reference level.*

*31. The apparatus as set forth in claim 26, wherein:*

*said microcomputer is further configured to check said vertical synchronous signal terminal to determine whether the vertical synchronous signal is input, when said microcomputer does not detect a horizontal syn-*

*chronous signal input from said horizontal/composite synchronous signal terminal; and*

*said microcomputer is further configured to make a determination that only the vertical synchronous signal has been input when it is determined that said vertical synchronous signal is input from said vertical synchronous signal terminal.*

*32. The apparatus as set forth in claim 26, wherein:*

*said microcomputer is further configured to check said vertical synchronous signal terminal to determine whether the vertical synchronous signal is input when said microcomputer does not detect a horizontal synchronous signal input from said horizontal/composite synchronous signal terminal;*

*said microcomputer is further configured to check for input of said horizontal synchronous signal from said synchronous-on-green terminal when it is determined that said vertical synchronous signal is not input from said vertical synchronous signal terminal;*

*said microcomputer is further configured to check for input of said vertical synchronous signal from said synchronous-on-green terminal when it is determined that said horizontal synchronous signal is input from said synchronous-on-green terminal;*

*said microcomputer is further configured to make a determination that the vertical and horizontal synchronous signals are input from said synchronous-on-green terminal, when it is determined that said vertical synchronous signal is input from said synchronous-on-green terminal; and*

*said microcomputer is further configured to adjust the polarities of the vertical and horizontal synchronous signals input from said synchronous-on-green terminal and then separately outputting the horizontal and vertical synchronous signals.*

*33. The apparatus as set forth in claim 26, wherein:*

*said microcomputer is further configured to check said vertical synchronous signal terminal to determine whether the vertical synchronous signal is input when said microcomputer does not detect a horizontal synchronous signal input from said horizontal/composite synchronous signal terminal;*

*said microcomputer is further configured to check for input of said horizontal synchronous signal from said synchronous-on-green terminal when it is determined that said vertical synchronous signal is not input from said vertical synchronous signal terminal;*

*said microcomputer is further configured to check for input of said vertical synchronous signal from said synchronous-on-green terminal when it is determined that said horizontal synchronous signal is input from said synchronous-on-green terminal; and*

*said microcomputer is further configured to make a determination that only the horizontal synchronous signal has been input from said synchronous-on-green terminal when it is determined that said vertical synchronous signal is not input from said synchronous-on-green terminal.*

*34. An apparatus for detecting and separating horizontal and vertical synchronous signals received by a monitor from a computer, comprising:*

*a microcomputer connected to a vertical synchronous signal terminal, a horizontal/composite synchronous signal terminal and a synchronous-on-green terminal of said computer to detect inputs of said horizontal and vertical synchronous signals from said computer; and*

*said microcomputer generating reference vertical and horizontal synchronous signals when no input is received from said vertical synchronous signal terminal, said horizontal/composite synchronous signal terminal and said synchronous-on-green terminal of said computer;*

*said microcomputer is further configured to adjust the polarity of the horizontal synchronous signal and clamping a front porch portion of the horizontal synchronous signal to the predetermined reference level when it determines that only said horizontal synchronous signal is received from said horizontal/composite synchronous signal terminal.*

*35. An apparatus for detecting and separating vertical and horizontal synchronous signals received by a monitor from a computer, comprising:*

*a microcomputer connected to a vertical synchronous signal terminal, a horizontal/composite synchronous signal terminal and a synchronous-on-green terminal of said computer;*

*said microcomputer checking said horizontal/composite synchronous signal terminal to determine whether the horizontal synchronous signal is input;*

*said microcomputer checking said vertical synchronous signal terminal to determine whether the vertical synchronous signal is input, when it is determined that the horizontal synchronous signal is not input from said horizontal/composite synchronous signal terminal;*

*said microcomputer checking said synchronous-on-green terminal to determine whether said horizontal synchronous signal is input, when it is determined that the vertical synchronous signal is not input from said vertical synchronous signal terminal; and*

*said microcomputer making a determination that no synchronous signal has been input, generating reference vertical and horizontal synchronous signals and again checking said horizontal/composite synchronous signal terminal, when it is determined that the horizontal synchronous signal is not input from said synchronous-on-green terminal.*

*36. The apparatus as set forth in claim 35, wherein:*

*said microcomputer is further configured to check said vertical synchronous signal terminal to determine whether the vertical synchronous signal is input when it is determined that the horizontal synchronous signal is input from said horizontal/composite synchronous signal terminal and to determine whether said horizontal synchronous signal has a positive polarity or a negative polarity when it is determined that the horizontal synchronous signal is input from said horizontal/composite synchronous signal terminal and the vertical synchronous signal is not input from said vertical synchronous signal terminal and to set the polarity of said horizontal synchronous signal to positive when it is determined that said horizontal synchronous signal has a positive polarity.*

*37. The apparatus as set forth in claim 36, wherein:*

*said microcomputer is further configured to set the polarity of said horizontal synchronous signal to negative, when it is determined that said horizontal synchronous signal has a negative polarity;*

*said microcomputer is further configured to check said horizontal/composite synchronous signal terminal to determine whether the vertical synchronous signal is input, after setting the polarity of said horizontal synchronous signal to negative;*

*said microcomputer is further configured to make a determination that only the horizontal synchronous signal is input from said horizontal/composite synchronous signal terminal and clamping a front porch of the horizontal synchronous signal to a reference level when it is determined that said vertical synchronous signal is not input from said horizontal/composite synchronous signal terminal; and*

*said microcomputer is further configured to make a determination that a composite synchronous signal is input from said horizontal/composite synchronous signal terminal, that the polarity of said horizontal and vertical synchronous signals are both negative and clamping a back porch of the horizontal synchronous signal to a reference level when it is determined that said vertical synchronous signal is input from said horizontal/composite synchronous signal terminal.*

*38. The apparatus as set forth in claim 36, wherein:*

*said microcomputer is further configured to determine whether said horizontal synchronous signal has a positive polarity or a negative polarity, when it is determined that the vertical synchronous signal is input from said vertical synchronous signal terminal;*

*said microcomputer is further configured to determine whether said vertical synchronous signal from said vertical synchronous signal terminal has a positive polarity or a negative polarity, when it is determined that said horizontal synchronous signal has a positive polarity; and*

*said microcomputer is further configured to make a determination that separate horizontal and vertical synchronous signal are input, that said horizontal and vertical synchronous signals have a positive polarity and clamping a back porch of the horizontal synchronous signal to a reference level when it is determined that said vertical synchronous signal from said vertical synchronous signal terminal has a positive polarity.*

*39. The apparatus as set forth in claim 38, wherein:*

*said microcomputer is further configured to make a determination that separate horizontal and vertical synchronous signal are input, that said horizontal synchronous signal has a positive polarity and said vertical synchronous signal has a negative polarity and clamping a back porch of the horizontal synchronous signal to a reference level when it is determined that said vertical synchronous signal from said vertical synchronous signal terminal has a negative polarity.*

*40. The apparatus as set forth in claim 36, wherein:*

*said microcomputer is configured to determine whether said horizontal synchronous signal has a positive polarity or a negative polarity, when it is determined that the vertical synchronous signal is input from said vertical synchronous signal terminal;*

*said microcomputer is configured to determine whether said vertical synchronous signal from said vertical synchronous signal terminal has a positive polarity or a negative polarity, when it is determined that said horizontal synchronous signal has a negative polarity; and*

*said microcomputer is configured to make a determination that separate horizontal and vertical synchronous signal are input, that said horizontal and vertical synchronous signals have a negative polarity and clamping a back porch of the horizontal synchronous signal to a reference level when it is determined that said vertical synchronous signal from said vertical synchronous signal terminal has a negative polarity.*

*41. The apparatus as set forth in claim 40, wherein:*

*said microcomputer is further configured to make a determination that separate horizontal and vertical synchronous signal are input, that said horizontal synchronous signal has a negative polarity and said vertical synchronous signal has a positive polarity and clamping a back porch of the horizontal synchronous signal to a reference level, when it is determined that said vertical synchronous signal from said vertical synchronous signal terminal has a positive polarity.*

*42. The apparatus as set forth in claim 40, wherein:*

*said microcomputer is further configured to check for input of said vertical synchronous signal from said synchronous-on-green terminal when it is determined that said horizontal synchronous signal is input from said synchronous-on-green terminal;*

*said microcomputer is further configured to make a determination that olly the horizontal synchronous signal has been input from said synchronous-on-green terminal, when it is determined that said vertical synchronous signal is not input from said synchronous-on-green terminal; and*

*said microcomputer is further configured to make a determination that the vertical and horizontal synchronous signals are input from said synchronous-on-green terminal, when it is determined that said vertical synchronous signal is input from said synchronous-on-green terminal, and then setting the polarity of the vertical and horizontal synchronous signal to positive.*

*43. The apparatus as set forth in claim 35, wherein:*

*said microcomputer is further configured to check said horizontal/composite synchronous signal terminal to determine whether the vertical synchronous signal is input, after setting the polarity of said horizontal synchronous signal to positive and to make a determination that only the horizontal synchronous signal is input from said horizontal/composite synchronous signal terminal and clamping a front porch of the horizontal synchronous signal to a reference level, when it is determined that said vertical synchronous signal is not input from said horizontal/composite synchronous signal terminal.*

*44. The apparatus as set forth in cain 43, wherein:*

*said microcomputer is further configured to make a determination that a composite synchronous signal is input from said horizontal/composite synchronous signal terminal, that the polarity of said horizontal and vertical synchronous signals are both positive and clamping a back porch of the horizontal synchronous signal to a reference level, when it is determined that said vertical synchronous signal is input from said horizontal/composite synchronous signal terminal.*

*45. The apparatus as set forth in claim 35, wherein:*

*said microcomputer is further configured to make a determination that only the vertical synchronous signal has been input when it is determined that said vertical synchronous signal is input from said vertical synchronous signal terminal.*

*46. A storage medium having stored thereon a set of instructions implementing a method for detecting and separating horizontal and vertical synchronous signals received by a monitor from a computer, said set of instruction comprising one or more instructions for:*

*generating reference vertical and horizontal synchronous signals when no vertical nor horizontal synchronous signals from said computer are detected while checking*

*a vertical synchronous signal terminal, a horizontal/composite synchronous signal terminal and a synchronous-on-green terminal of said computer for said vertical and horizontal synchronous signals;*

*determining whether a composite synchronous signal is received when the horizontal synchronous signal is detected at said horizontal/composite synchronous signal terminal; adjusting polarities of the vertical and horizontal synchronous signals, when it is determined that said composite synchronous signal is received;*

*clamping a back porch portion of the horizontal synchronous signal to a predetermined reference level; and*

*outputting separated horizontal and vertical synchronous signals.*

*47. The storage medium as set forth in claim 46, said set of instructions further comprising further one or more instructions for:*

*adjusting the polarity of the horizontal synchronous signal and clamping a front porch portion of the horizontal synchronous signal to the predetermined reference level when it is determined that only said horizontal synchronous signal is input from said horizontal/composite synchronous signal terminal.*

*48. The storage medium as set forth in claim 46, said set of instructions further comprising one or more instructions for:*

*determining whether the vertical synchronous signal is received via the vertical synchronous signal terminal when it is determined that the horizontal synchronous signal is detected at said horizontal/composite synchronous signal terminal;*

*determining whether said horizontal synchronous signal has a positive polarity or a negative polarity, when it is determined that the vertical synchronous signal is received via said vertical synchronous signal terminal;*

*determining whether said vertical synchronous signal received via said vertical synchronous signal terminal has a positive polarity or a negative polarity, when it is determined that said horizontal synchronous signal has a positive polarity;*

*making a determination that separate horizontal and vertical synchronous signal are input, that said horizontal and vertical synchronous signals have a positive polarity and clamping a back porch of the horizontal synchronous signal to the reference level, when it is determined that said vertical synchronous signal received via said vertical synchronous signal terminal has a positive polarity; and*

*outputting the separate horizontal and vertical synchronous signals after clamping the back porch of the horizontal synchronous signal to said reference level.*

*49. The storage medium as set forth in claim 46, said set of instructions further comprising one or more instructions for:*

*determining whether the vertical synchronous signal is received via the vertical synchronous signal terminal when the horizontal synchronous signal is detected at said horizontal/composite synchronous signal terminal;*

*determining whether said horizontal synchronous signal has a positive polarity or a negative polarity, when it is determined that the vertical synchronous signal is received via said vertical synchronous signal terminal;*

*determining whether said vertical synchronous signal received via said vertical synchronous signal terminal has a positive polarity or a negative polarity, when it is determined that said horizontal synchronous signal has a positive polarity;*

*making a determination that separate horizontal and vertical synchronous signal are input, that said horizontal synchronous signal has as positive polarity and said vertical synchronous signal has a negative polarity and clamping a back porch of the horizontal synchronous signal to the reference level, when it is determined that said vertical synchronous signal received via said vertical synchronous signal terminal has a negative polarity; and*

*outputting the separate horizontal and vertical synchronous signals after clamping the back porch of the horizontal synchronous signal to said reference level.*

*50. The storage medium as set forth in claim 46, said set of instructions further comprising one or more instructions for:*

*determining whether said horizontal synchronous signal has a positive polarity or a negative polarity, when it is determined that the vertical synchronous signal is received via said vertical synchronous signal terminal;*

*determining whether said vertical synchronous signal received via said vertical synchronous signal terminal has a positive polarity or a negative polarity, when it is determined that said horizontal synchronous signal has a negative polarity;*

*making a determination that separate horizontal and vertical synchronous signal are input, that said horizontal and vertical synchronous signals have a negative polarity and clamping a back porch of the horizontal synchronous signal to a reference level, when it is determined that said vertical synchronous signal received via said vertical synchronous signal terminal has a negative polarity; and*

*outputting the separate horizontal and vertical synchronous signals after clamping the back porch of the horizontal synchronous signal to said reference level.*

*51. The storage medium as set forth in claim 46, said set of instructions further comprising one or more instructions for:*

*determining whether said horizontal synchronous signal has a positive polarity or a negative polarity, when it is determined that the vertical synchronous signal is received via said vertical synchronous signal terminal;*

*determining whether said vertical synchronous signal received via said vertical synchronous signal terminal has a positive polarity or a negative polarity, when it is determined that said horizontal synchronous signal has a negative polarity;*

*making a determination that separate horizontal and vertical synchronous signal are input, that said horizontal synchronous signal has a negative polarity and said vertical synchronous signal has a positive polarity and clamping a back porch of the horizontal synchronous signal to a reference level, when it is determined that said vertical synchronous signal received via said vertical synchronous signal terminal has a positive polarity; and*

*outputting the separate horizontal and vertical synchronous signals after clamping the back porch of the horizontal synchronous signal to said reference level.*

*52. The storage medium as set forth in claim 46, said set of instructions further comprising one or more instructions for:*

*checking said vertical synchronous signal terminal to determine whether the vertical synchronous signal is input, when the horizontal synchronous signal is not detected at said horizontal/composite synchronous signal terminal; and*

*making a determination that only the vertical synchronous signal has been input when it is determined that said vertical synchronous signal is input from said vertical synchronous signal terminal.*

*53. The storage medium as set forth in claim 46, said set of instructions future comprising one or more instructions for:*

*checking said vertical synchronous signal terminal to determine whether the vertical synchronous signal is input, when the horizontal synchronous signal is not detected at said horizontal/composite synchronous signal terminal;*

*checking for input of said horizontal synchronous signal from said synchronous-on-green terminal, when it is determined that said vertical synchronous signal is not input from said vertical synchronous signal terminal;*

*checking for input of said vertical synchronous signal from said synchronous-on-green terminal, when it is determined that said horizontal synchronous signal is input from said synchronous-on-green terminal;*

*making a determination that the vertical and horizontal synchronous signals are input from said synchronous-on-green terminal, when it is determined that said vertical synchronous signal is input from said synchronous-on-green terminal; and*

*adjusting polarities of the vertical and horizontal synchronous signals input from said synchronous-on-green terminal and then separately outputting the horizontal and vertical synchronous signals.*

*54. The storage medium as set forth in claim 46, said set of instructions further comprising one or more instructions for:*

*checking said vertical synchronous signal terminal to determine whether the vertical synchronous signal is input, when the horizontal synchronous signal is not detected at said horizontal/composite synchronous signal terminal;*

*checking for input of said horizontal synchronous signal from said synchronous-on-green terminal, when it is determined that said vertical synchronous signal is not input from said vertical synchronous signal terminal;*

*checking for input of said vertical synchronous signal from said synchronous-on-green terminal, when it is determined that said horizontal synchronous signal is input from said synchronous-on-green terminal; and making a determination that only the horizontal synchronous signal has been input from said synchronous-on-green terminal, when it is determined that said vertical synchronous signal is not input from said synchronous-on-green terminal.*

* * * * *